Dec. 3, 1929.  B. VAN DE WATER  1,738,128
DIRECTION INDICATOR
Filed June 26, 1929   2 Sheets-Sheet 1
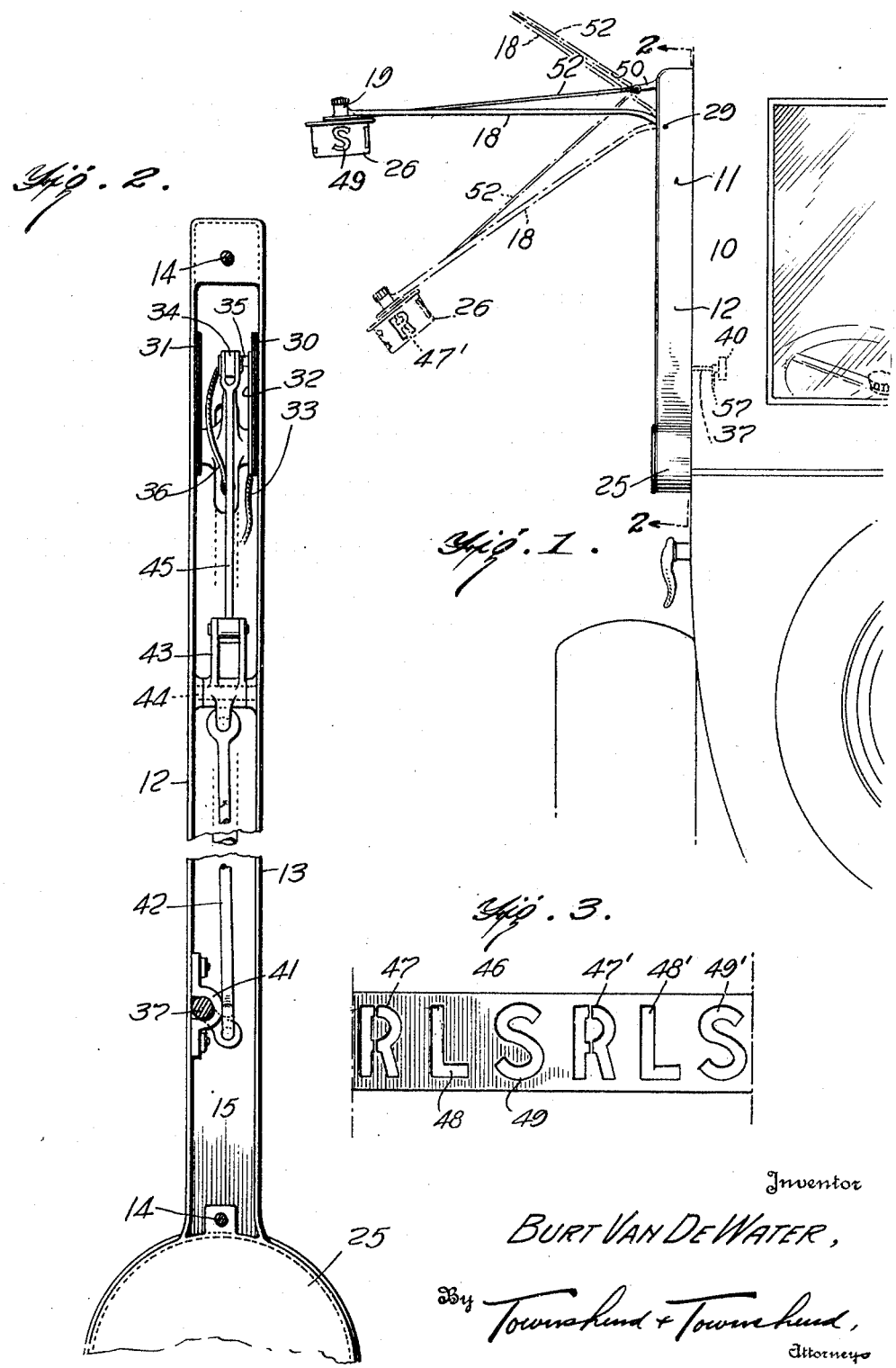
Inventor
BURT VAN DE WATER,
By Townshend & Townshend,
Attorneys

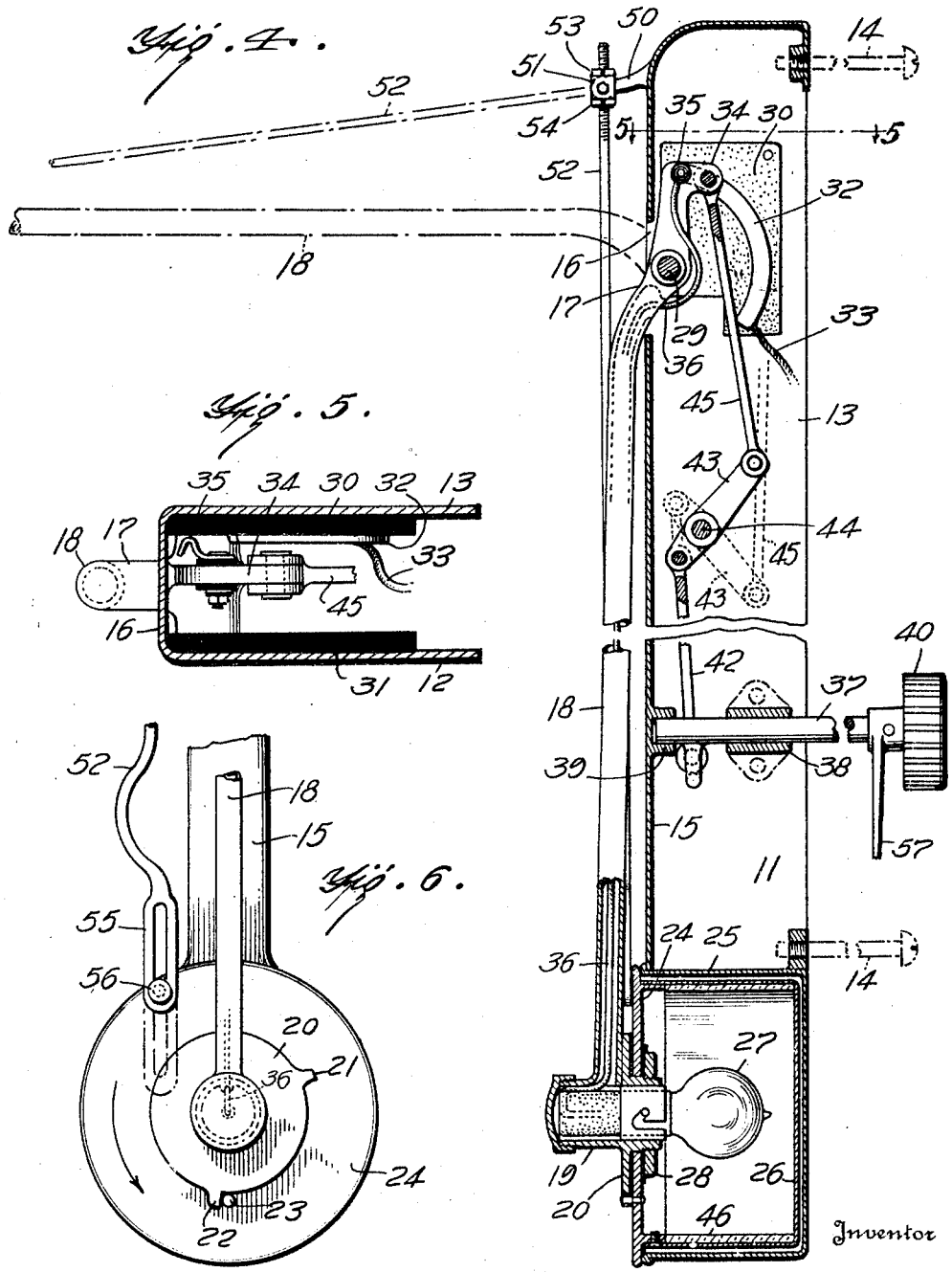

Patented Dec. 3, 1929

1,738,128

UNITED STATES PATENT OFFICE

BURT VAN DE WATER, OF MODESTO, CALIFORNIA

DIRECTION INDICATOR

Application filed June 26, 1929. Serial No. 373,797.

This invention relates to automobile appliances designed for manual control by the operator of an automobile in such a manner as to give a visual indication of the intention of the driver relative to making turns or stopping in traffic. In particular the invention contemplates a vertically swinging indicator arm, equipped with an illuminated signal, which moves in simulation of the conventional arm signals given outwardly of the left hand side of an automobile.

Objects of the invention are: to provide a manually operable direction indicator provided with means for changing the signal indication thereof during movement of an indicator element; to provide in a direction indicator of this character means for automatically changing the signal indication to correspond with the movement of an indicator arm with which the device is equipped; to provide in a direction indicator of this character, novel means for actuating a changeable exhibitor carried by a semaphore; and generally to provide novel operating mechanism for a vertically swinging semaphore indicator.

With these and such other objects in view as will be apparent from the description, the invention resides in the novel construction, combination and arrangement of parts hereinafter described and claimed and illustrated in the accompanying drawings, wherein is shown one practical, physical embodiment of the principles of this invention.

Figure 1 is an elevation of a portion of an automobile equipped with the direction indicator of this invention and illustrating in full lines the position of the signal at one extremity of its path of movement in operation, illustrating also in dotted lines other operative positions which the semaphore may assume under the control of an operator.

Figure 2 is a vertical section taken on the line 2—2 of Figure 1.

Figure 3 is a schematic plan of an indicia carrying element of a changeable exhibitor employed in connection with the semaphore.

Figure 4 is a vertical section through the signal apparatus with the semaphore arm at its extreme lower inoperative position and illustrating in dotted lines the position of parts assumed by the apparatus when the semaphore arm is in fully extended position.

Figure 5 is a horizontal section on the line 5—5 of Figure 4.

Figure 6 is a fragmentary side elevation illustrating the external appearance of the outer end of the semaphore arm carrying a changeable exhibitor element.

The invention is illustrated as applied to the outside of any conventional automobile door or windshield frame construction generally indicated as at 10, and in detail consists of a vertically elongated housing 11 having spaced parallel side walls 12 and 13 which is secured in any suitable manner such as by retaining bolts 14 to a contiguous part of the automobile body frame 10. The outer wall 15 of the housing is vertically slotted as at 16 adjacent its upper end to permit the extension therethrough of the inturned inner end portion 17 of a semaphore arm 18 which, as illustrated in Figure 4, in the normal nonindicating position of the parts extends downwardly over the outer wall 15 of the housing. This semaphore arm 18 is formed throughout the major portion of its length as a hollow tube having connection at its outer end with a cylindrical electric light bulb socket 19 having an annular flat base flange 20 formed with radially extending spaced stop lugs 21 and 22 which cooperate with a pin 23 carried by a rotatable disk 24 to limit rotation of the said disk in opposite directions.

At its lower end the housing or casing 11 is formed or otherwise provided with a cylindrical socket 25 designed to receive and house a rotatable changeable exhibitor 26 carried by the rotary disk 24 in positive connection therewith, which changeable exhibitor is substantially cup-shaped and is so connected with the disk 24 as to enclose an electric light bulb 27 mounted within its socket 19 in the conventional manner. The rotary disk 24 is centrally apertured for a rotatable bearing upon the cylindrical socket 19 being held in position between the base flange 20 of the socket member 19 and a nut 28 threaded onto the body of the socket member as illustrated in detail in Figure 4. This construction permits freedom of rotation of the changeable exhibitor when the disk 24 is rotated by means to be hereinafter described.

The inturned inner end portion 17 of the semaphore arm 18 is pivoted within the casing 11 for vertical swinging movement upon a horizontal pivot pin 29 secured transversely between the side walls 12 and 13 of the housing, which pivot pin also passes through blocks 30 and 31 of insulating material which are secured respectively to the side walls 13 and 12. One of the insulating blocks, designated as 30, has secured thereto an arcuate contact segment 32 which is in electrical connection by means of a lead wire 33 with a suitable source of current supply not shown, by means of which the bulb 27 may be lighted. Beyond the pivot pin 29, the inner end portion 17 of the semaphore arm is formed as a bell crank 34 carrying a wiping contact member 35 extending laterally therefrom and having a bearing contact upon the segment 32 as best illustrated in Figure 2. From this contact member 35 a circuit wire 36 leads through the tubular body of the semaphore arm 18 into contact with the base of the electric light bulb 27 and mounted within its socket 19, the return of the circuit being effected by grounding the opposite side of the circuit upon the framework or some suitable point of the casing in any conventional manner. The length of the contact segment 32 is only sufficient to effect engagement with the wiping contact 35 during the operative arc of movement of the inner end of the semaphore arm 18, and in the inoperative position of the semaphore, the wiping contact 35 is disposed in spaced relation from one end of the segment 32 so that no contact is established and the bulb 27 will not be illuminated.

Vertical swinging movement of the semaphore arm 18 is accomplished by the application of power to a shaft 37 journalled horizontally within the casing 11 between a bearing 38 carried by the side wall 12 and an end thrust bearing 39 formed on the inner face of the wall 15. Power for rotating the shaft 37 is applied by any suitable operating means generally designated as at 40, preferably of the manual control type disposed internally of the automobile adjacent the operator thereof. The particular construction of this power means 40 for rotating the shaft 37 forms no part of this invention as the various types of automobile construction require differences in this detail.

The shaft 37 carries a crank 41 having pivotal connection with the lower end of a link bar 42, the upper end of which is in pivotal connection with one end of a rocking lever 43 pivoted for rocking movement in a vertical plane upon a horizontal pivot pin 44 secured between the side walls 12 and 13 of the housing. The opposite end of the rocking lever 43 is in pivotal connection with a rod 45 having its opposite end pivotally connected with the bell crank 34 of the semaphore arm. This leverage connection just described causes a vertical swinging movement of the semaphore arm 18 when the shaft 37 is rotated in the proper direction. In the position of parts as illustrated in Figures 2 and 4, a counter-clockwise rotation of the shaft 37 elevates the link 42 to rock the lever 43 upon its fulcrum 44 into the dotted line position, as shown in Figure 4, depressing and drawing down the rod 45 which in turn exerts a downward pressure upon the bell crank 34 carried on the semaphore arm 18. As this arm is fulcrumed at 29, it is obvious that the rotation of the shaft, as described will cause the semaphore arm 18 to move laterally outward of the casing 11 and swing in a vertical plane through an arc of movement which terminates with the semaphore arm 18 in fully extended position as shown in Figure 1 and also in dotted lines in Figure 4. It is obvious that at any point during this cycle of movement the rotation of the shaft 37 may be arrested so that the semaphore arm may be caused to assume any of the positions illustrated in full lines and dotted lines in Figure 1.

The changeable exhibitor 26 is circumferentially apertured so as to render the light bulb 27 visible therethrough and the apertured portion is covered internally by some translucent indicia carrying element 46 which may be made of glass or celluloid and which carries a series of signal letters 47, 48, 49, 47', 48' and 49'. In the assembled position of the indicia carrying element 46 the letter portions 47 and 47' will be diametrically opposed as will also the letter portions 48 and 48', 49 and 49', the object being to assure a letter indication of the changeable exhibitor both to the front and rear of the automobile.

Having described the manner in which the semaphore arm is moved through its operating cycle, the means for effecting rotation of the changeable exhibitor will now be described in detail. The upper end of the housing 11 is provided with a bearing member 50 extending laterally therefrom and formed to provide a horizontal pivotal bearing for an eye bolt 51 disposed therethrough. The eye of the bolt 51 receives therethrough the threaded inner end of an actuating rod 52 which is adjustably regulated relative to the eye bolt by means of nuts 53 and 54 threaded over the rod 52 at opposite sides of the eye.

The outer end of the actuating rod 52 is formed as a yoke 55 having sliding cooperative engagement with a headed pin 56 rigidly secured to the outer face of the rotary disk 24. By means of the adjusting nuts 53 and 54 the position of the actuator rod 52 relative to the pin 56 of the rotary disk 24 may be adjusted as desired to effect the proper rotation of the disk in the operation of the changeable exhibitor.

As the semaphore arm 18 is raised through the operating means previously described, the actuator arm 52 will swing upon its pivot 51 which is the eye bolt, and as this is a relatively fixed pivot point, the yoke 55 at the other end of the actuator arm will have a relative sliding engagement with the pin 56 on the rotary disk 24 and one end of the yoke will abut the pin 56 during continued movement of the semaphore arm 18 so as to rotate the disk 24 and thereby the changeable exhibitor 26 in the direction indicated by the arrow in Figure 6.

At the extreme extension of the semaphore arm as indicated in Figure 1, the changeable exhibitor will have been rotated to its extremity until the pin 23 abuts the stop lug 21, as shown in Figure 6, and in this position of the parts the indicia carrying element 46 will be so positioned that the letter portions 47 and 47' are visible both to front and rear of the automobile, the bulb 27 having been lighted as soon as the wiping contact member 35 moves onto the segment 32. At a lesser degree of outward movement of the semaphore arm, in such position as employed to simulate the position of an operator's arm when signalling a stop, the changeable exhibitor will have been rotated to a degree sufficient to bring the letter portions 49 and 49' into position to indicate to the front and rear of the vehicle. Also when it is desired to signal a right turn, the semaphore arm is positioned at the proper angle of inclination so that the letter portions 47 and 47' will indicate to the front and rear of the vehicle.

It is obvious that the position of the indicia carrying element 46 may be regulated in accordance with different requirements for signalling positions of the semaphore arm as it is a matter of common knowledge that in some localities the arm signals differ from the generally accepted indicating positions. It is also to be noted that the operating means 40 may be provided with some suitable internal indicator means, which may be a pointer 57 so that the operator may be aware of the position assumed by the semaphore arm without looking directly at the same. It is also intended by me that various changes and modifications may be made within the structural details of this invention and the form as illustrated and described is not to be taken as a limitation, but merely as an illustrative embodiment. Any changes and modifications may be made within the structural details as will fall within the scope of the invention as claimed.

I claim:

1. A direction indicator comprising a support, a semaphore pivotally mounted thereon for swinging movement, a changeable exhibitor carried by said semaphore, and an actuator rod for said exhibitor having pivotal connection at one end with said support and slidable connection at its other end with said exhibitor.

2. A direction indicator comprising a support, a semaphore pivoted thereto for swinging movement, a changeable exhibitor carried by said semaphore, and an exhibitor actuating rod extending between and engaging said exhibitor and support, said rod having a fixed pivotal connection at one end and a sliding positive connection at the other.

3. A direction indicator comprising a support, a semaphore pivoted thereto, a changeable exhibitor carried by said semaphore, means for moving the semaphore on its pivot, and a rigid actuator element pivoted to said support and operatively engaging said exhibitor for actuation thereof on movement of the semaphore, said actuator element being disposed for movement substantially parallel with said semaphore.

4. A direction indicator comprising a support, a semaphore pivoted thereto, a changeable exhibitor mounted on said semaphore, means for operating said semaphore, and means for actuating said exhibitor upon operation of the semaphore, said actuating means including a rod having pivotal connection at one end with said support at a point spaced laterally and vertically from the pivot of said semaphore.

In testimony whereof, I affix my signature.

BURT VAN DE WATER.